April 30, 1935.  J. L. BURNETT  1,999,394
FRONT AXLE CONSTRUCTION
Filed Nov. 19, 1932

INVENTOR.
JOHN L. BURNETT.
BY
ATTORNEYS.

Patented Apr. 30, 1935

1,999,394

UNITED STATES PATENT OFFICE.

1,999,394

FRONT AXLE CONSTRUCTION

John L. Burnett, Detroit, Mich., assignor to Chrysler Corporation, Detroit, Mich., a corporation of Delaware Application November 19, 1932, Serial No. 643,419

4 Claims. (Cl. 280—96.1)

My invention relates to vehicle construction and has particular relation to the front axle construction of dirigible vehicles, such as automobiles.

The object of my invention is to provide a novel type of front axle construction which eliminates the difficulties attendant upon the employment of the usual type of thrust bearing and permits the employment of a simple, inexpensive, durable, and readily assembled construction which requires no separate thrust bearing.

For better understanding of my invention, reference may now be had to the accompanying drawing, of which:

Figure 1:
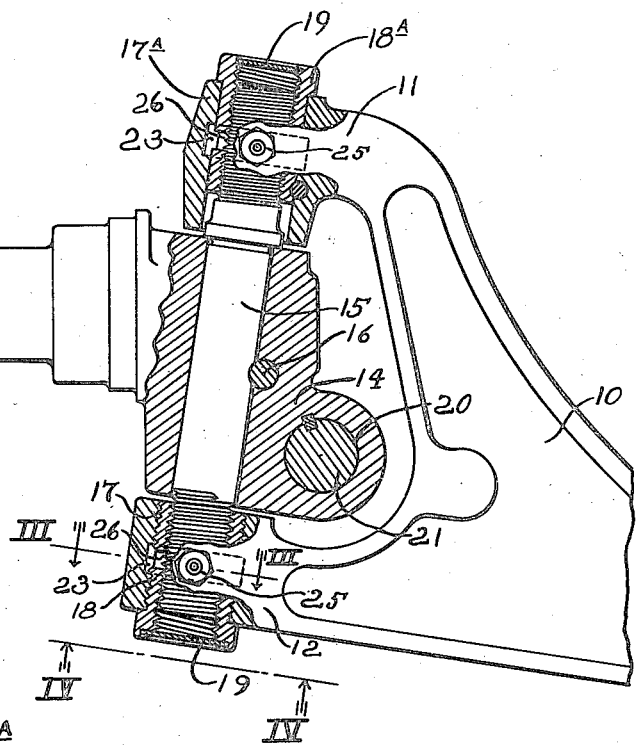
Fig. 1 is a view, partly in cross-section and partly in side elevation, of a front axle construction embodying one form of my invention.
Figure 2:
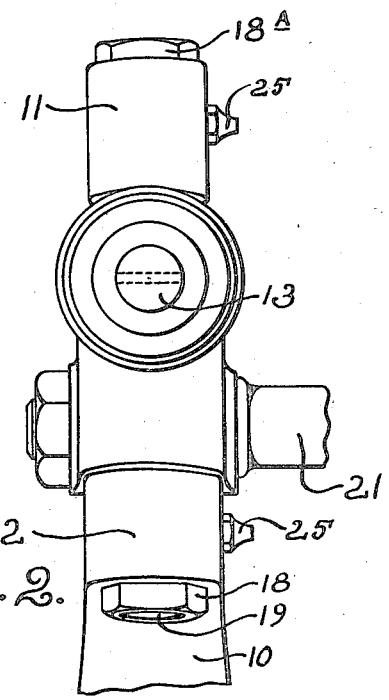
Fig. 2 is an end elevational view of the structure illustrated in Fig. 1, the view being taken from the plane indicated by the line II—II of Fig. 1.
Figure 3:
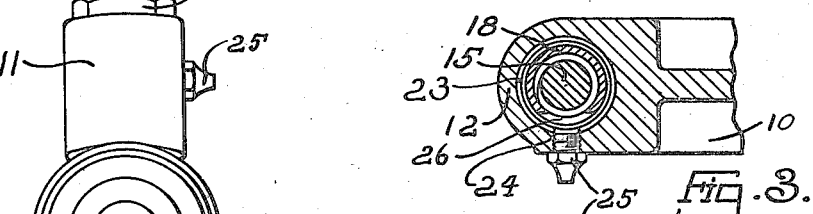
Fig. 3 is a cross-sectional view of one of the bearing structures illustrated in Fig. 1, the view being taken along the line III—III thereof.
Figure 4:
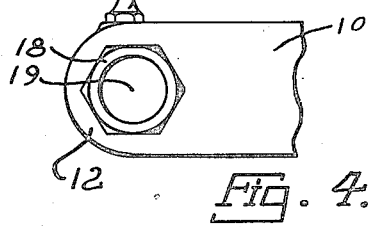
Fig. 4 is a plan view of a portion of Fig. 1, the view being taken along the plane indicated by the line IV—IV thereof.

In the drawing I have illustrated a front axle construction 10 having a forked end portion comprising an upper portion 11 and a spaced lower portion 12. The wheel spindle 13, which is adapted to support one wheel of the automobile, is provided with an offset body portion 14, which is rigidly secured to a king pin 15 by means of a key 16.

The member 12 is provided with a substantially vertically extending opening 17, disposed in alignment with a corresponding opening 17a in the upper portion 11 of the axle 10. The walls of the opening 17 are threaded to receive an externally threaded cylindrical bushing 18. The interior walls of the bushing 18 are also threaded and receive in threaded engagement the lower end of the king pin 15. The end of the bushing 18 is sealed by means of a Welsh plug 19, or other suitable device, to prevent the admission of dirt or other foreign matter thereto and to prevent the escape of lubricant therefrom.

The body portion 14 of the spindle 13 is provided with an opening 20 into which is fitted a steering knuckle or arm 21, which is connected to the steering gear of the car. When the spindle 13 is rotated, by means of the arm 21, the king pin 15 rotates within the bushing 18, the coacting threads of the two members serving as both bushing and thrust bearing, thus eliminating the necessity of an additional thrust bearing.

The upper portion 11 of the axle 10 is provided with an opening 17a which is disposed in alignment with the opening 17 in the lower portion 12. The interior walls of the opening 17a are smooth and receive a bushing 18a, the exterior surface of which is smooth and the interior surface of which is threaded to receive in threaded engagement the upper end of the king pin 15. The end of the bushing 18a is sealed by means of a Welsh plug 19, as previously described.

It will be apparent that, by making the sleeve 18 threaded on both the interior and exterior surfaces, the space between the body portion of the spindle 14 and the lower portion 12 of the axle 10 may be very accurately fixed, and that the upper bushing 18a, by reason of having a smooth sliding fit with the walls of the opening 17a, will adjust itself accordingly.

In assembling this structure, the body portion 14 of the spindle 13 is placed between the portions 11 and 12 of the axle 10 with their respective king pin receiving openings in alignment. The king pin 15 is then passed through the opening 17 and through the opening in the member 14 until it reaches a centralized position therein, at which time a key receiving notch in the pin 15 will register with a key receiving opening in the member 14. The key 16 is then inserted in the opening provided therefor, thus firmly securing the pin 15 and the member 14 in the desired fixed relationship. When the pin 15 and the memberf 14 are secured together in the proper relationship, the threaded lower end of the pin 15 projects into the opening 17.

The threaded bushing 18 is next introduced. As the exterior and interior threads of this bushing are of the same pitch the bushing may, by rotation, be moved into the space between the pin 15 and the walls of the opening 17 in threaded engagement with both and the axial position of the pin with respect to the member 12 remains the same as when the two sets of threads first become engaged. The bushing 18a is next introduced into the opening 17a, by causing threaded engagement of the pin and bushing and rotating the bushing to the desired position with respect to the member 11.

In order to lubricate these bearings, the end portions 11 and 12 of the axle are provided with arcuate or annular recesses 23 within the openings 17 and 17a and intermediate the ends thereof, which interrupt the threads of the opening 17 and the smooth surface of the opening 17a. In each instance a substantially radially extending passageway 24 extends through the side wall of the member 11 into open communication with the recess 23. A suitable alemite plug 25, or other lubricant admitting fitting, may be disposed in the opening 24 so as to seal it against the admission of foreign matter and prevent the escape of lubricant. The sleeves 18 and 18a are each provided with a radially extending passageway 26 extending therethrough which is in open communication with the arcuate recess 23 at one end and with the threaded portion of the king pin 15 at the other end so that lubricant forced through the opening 24 enters the arcuate recess 23 and completely fills it. Regardless of the angular position of the opening 26 and the bushing 18 or 18a, a passageway is always open from the recess 23 to the threads on the interior of the bushing 18 or 18a and the exterior of the king pin 15, between which rotation occurs during the normal steering of the vehicles.

Although I have illustrated but one form of my invention and have described in detail but a single application thereof it will be apparent to those skilled in the art that my invention is not so limited but that various modifications and changes may be made therein without departing from the spirit thereof or from the scope of the appended claims.

What I claim is:

1. In a front axle construction, an axle having two substantially vertically spaced end portions provided with aligned openings therein, an internally threaded bushing disposed within each of said openings, a king pin having threaded end portions extending through said bushings and in threaded engagement therewith, and a wheel spindle rigidly secured to the central portion of said king pin.

2. In a front axle construction, an axle having two substantially vertically spaced end portions provided with aligned openings therein, an internally threaded bushing disposed within each of said openings, a king pin having threaded end portions extending through said bushings and in threaded engagement therewith, a wheel spindle rigidly secured to the central portion of said king pin, and means adapted to close the ends of said bushings exteriorly of said king pin.

3. A front axle construction comprising an axle having a substantially vertically extending threaded opening therein, an internally and externally threaded bushing disposed in said opening in threaded engagement with the walls thereof, a king pin having a threaded portion extending through said bushing and in threaded engagement therewith, and a wheel spindle rigidly secured on said king pin.

4. A front axle construction comprising an axle having two substantially vertically spaced end portions provided with aligned openings therein, the walls of the opening in one end portion being threaded, an internally and externally threaded bushing disposed within said threaded opening in threaded engagement therewith, the walls of the opening in the other end portion being smooth, an externally smooth and internally threaded bushing disposed in said last mentioned opening, a king pin having threaded end portions extending through said bushings in threaded engagement therewith, and a wheel spindle rigidly secured to the central portion of said king pin.

JOHN L. BURNETT.